Aug. 23, 1966   J. BOUCHEZ   3,267,754
PROGRESSIVELY ADVANCING MECHANISM
Filed Nov. 12, 1964

Inventor
Jean Bouchez
by Michael J. Striker

United States Patent Office 3,267,754
Patented August 23, 1966

3,267,754
PROGRESSIVELY ADVANCING MECHANISM
Jean Bouchez, 130 Rue de Cambrai, Arras, France
Filed Nov. 12, 1964, Ser. No. 411,680
Claims priority, application France, Nov. 16, 1963,
954,004
5 Claims. (Cl. 74—117)

The present invention relates to a device for the conversion of a rotary movement into a progressively advancing oscillatory or reciprocatory movement, that is to say, a forward movement of a particular amplitude followed by a reverse movement of smaller amplitude. Thus, at each reciprocation there is an advance of the magnitude of the difference between the forward and the reverse amplitudes.

In accordance with the invention, this device is characterised by the fact that the circular movement of a first member of the device is converted into a reciprocatory movement of a second member having equal forward and reverse strokes, that a third member fast with the second drives a fourth member frictionally, that reverse movement of this fourth member is prevented by a stop and that this member is driven step by step by the first member through an angle corresponding to the difference in magnitude of the forward and reverse strokes of the fourth member.

Figure 1:
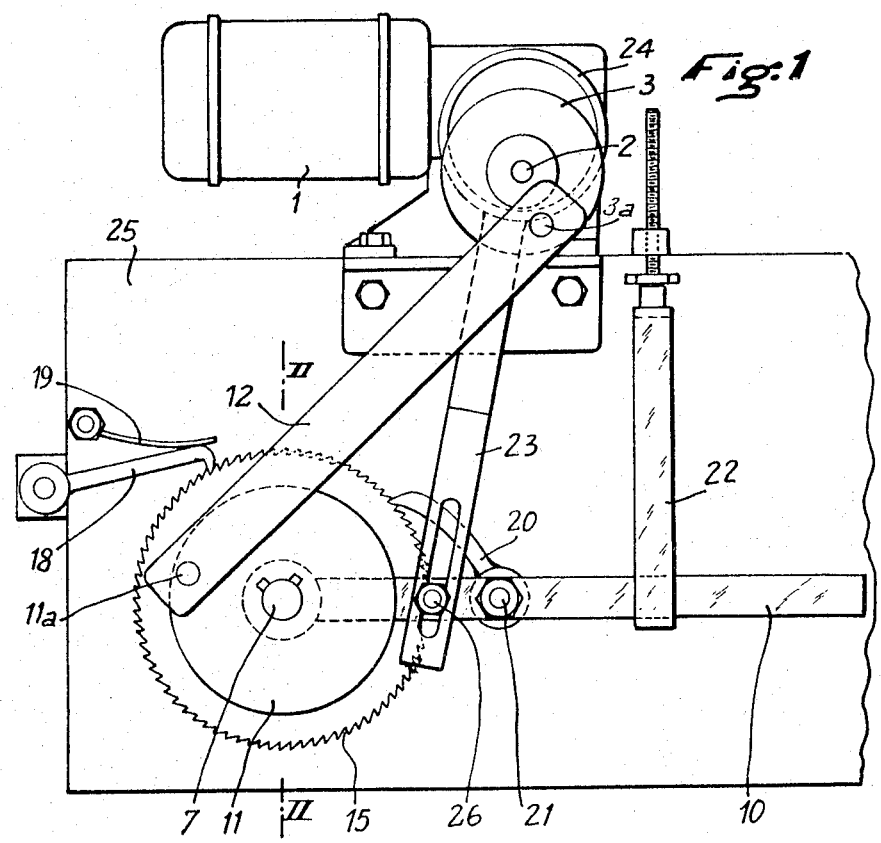
Figure 2:
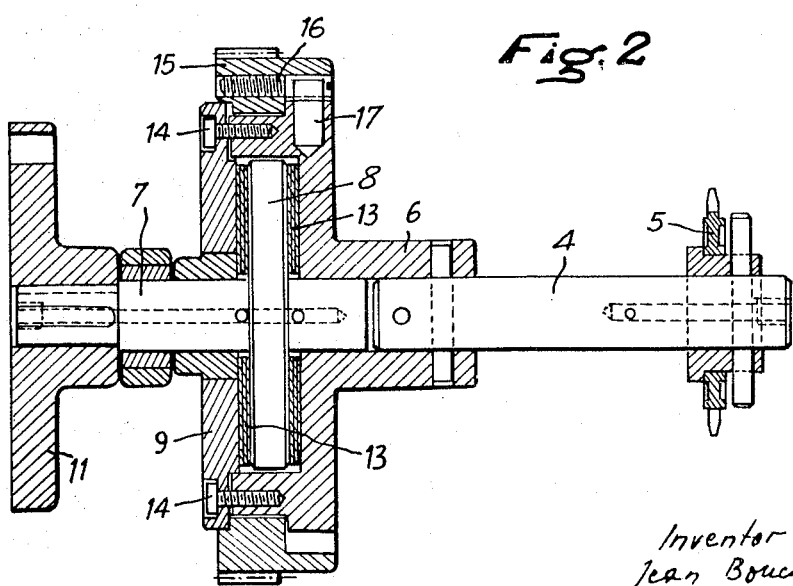

A device in accordance with the invention is shown by way of example in the accompanying drawings, in which:
FIGURE 1 is a front view of the device; and
FIGURE 2 is a section taken on the line II—II in FIGURE 1.

The converter shown in the drawings is driven by an electric motor 1 to the driven shaft 2 on which are fixed an eccentric 24 and a control disc 3.

The base 25 on which the motor 1 is mounted has journalled in it a shaft 4 to one end of which is keyed a sprocket 5 and to the other end a driving member 6. Mounted coaxially with the shaft 4, there is a shaft 7 one of the ends of which is mounted for free rotation in the bore of a hub on the driving member 6 and to which are keyed a disc 8 and a disc 11. This shaft supports the end of a lever 10 and carries freely a tightening plate 9. A connecting rod 12 connects the disc 11 to the driving plate 3, being connected to crank pins 11a and 3a on those parts respectively so that one complete revolution of the driving plate 3 results in an oscillation of the disc 11 of the same amplitude in each direction.

Between the disc 8 and the plates 6 and 9 there are a pair of friction washers 13 which can be tightened against each other by pressing-in the plate 9 by means of screws 14 engaged in holes in the driving member 6.

The peripheries of the members 6 and 9 define a groove in which a ratchet wheel 15 is mounted for rotation. This ratchet wheel is provided with a screw-threaded pin 16 forming a stop and which projects above the periphery of the driving member 6. The latter has a screw-threaded pin 17 which projects beyond the periphery and which is in the path of the pin 16. The ratchet wheel has engaged with it a check pawl 18 pressed into engagement by a spring 19 and a driving pawl 20 which is pivotally mounted on a pin 21 on the lever 10.

The lever 10 passes through an adjusting member 22 and has lugs 26 which are engaged in slots 27 in a connecting rod 23 the upper annular end of which rests on the eccentric 24.

The device functions as follows:
Before the motor 1 is started up, the lowermost position of the lever 10, or "forward" lever, is adjusted by raising or lowering the adjusting rod 22. The motor is then started up so that the shaft 2 drives the eccentric 24. The latter through the connecting rod 23 imparts to the lever 10 an oscillatory movement about the shaft 7.

The amplitude or stroke of this movement varies according to the position of the rod 22 which limits the downward displacement of the lever 10 and consequently reduces the amplitude of the oscillation of the lever 10. Whenever the lever 10 rises, the pawl 20 drives the ratchet wheel 15 counter-clockwise. The greater the displacement of the lever 10 or the lower is the rod 22, the greater will be the angular movement of the ratchet wheel.

The rotation of the motor 1 causes rotation of the disc 3 and therefore imparts an alternating movement to the disc 11 and hence to the shaft 7 and the disc 8. The forward and reverse strokes of these parts 11, 7 and 8 are of equal magnitude. The disc 8 transmits this movement to the parts 9 and 6 through the washers 13 and, through the part 6, to the shaft 4 and the output sprocket 5.

Because of the check pawl 18, the ratchet wheel 15 cannot rotate clockwise but can be rotated in the other direction by the driving pawl 20. The extent of the movement of the ratchet wheel depends upon that of the lever 10 as explained above. This is controlled by the connecting rod 23 but the downward movement can be reduced by the position of the screw-threaded pin 22.

As the parts 6 and 9 oscillate, the stop 17 on the part 6, at a particular instant during the reverse movement, comes up against the stop 16 on the ratchet wheel 15. The part 6 can then no longer move; nor can the part 9. Therefore, while the disc 8 continues its movement which is a function of that of the plate 11, the washers slip on the immobilised parts 6 and 9.

As soon as the next forward movement starts, the parts 6 and 9 are again driven by the washers 22.

Thus, the wheel 5 makes a forward movement corresponding to the total angular oscillatory movement of the plate 11 and then a reverse movement which is limited by the contact of the stop 17 with the stop 16 and which is a fraction of the forward movement.

Thus, for example the wheel 5 can move three teeth forward and two teeth backward. The stop 17 advances through one tooth space at each rotation of the shaft 2.

There is thus obtained an alternating movement of different amplitudes on the forward and on the reverse strokes with a resultant forward movement through a distance equal to the difference between those amplitudes at each complete oscillation.

There are many applications for such a converter. Thus, for example, the sprocket 5 can drive through a chain the tool of the cutting machine described in French Patent No. 1,109,662 of August 10, 1954. In that case, the tool cuts the metal sheet during the forward stroke, then moves back on the reverse stroke which has the effect of rectifying the groove cut in the sheet and of cooling the tool and the sheet.

What is claimed is:
1. A device of the character described comprising, in combination, support means; a first member having an axis and being mounted on said support means turnably about its axis; drive means connected to said first member for turning the same about said axis; a second member mounted on said support means turnably about a second axis; connecting means connecting said first to said second member in such a manner so that said second member is oscillated about said second axis through a forward and an equal return stroke during each revolution of said first member; a third member coaxial with said second member; friction means between said second and said third member for frictionally driving said third member along a forward and return stroke during oscillation of said second member; stop means movable along a path coaxial with said second axis and arranged for engagement with said third member for limiting the re- turn stroke of the latter; and moving means connecting said first member to said stop means for stepwise moving the latter along said path through forward strokes smaller than the forward strokes of said second member.

2. A device as set forth in claim 1, wherein said stop means include a ratchet whel coaxial with said third member and fixedly carrying a first stop, and a second stop fixed to said third member and arranged to engage with said first stop on said ratchet wheel during said return stroke of said third member, and a check pawl engaging said ratchet wheel and preventing the latter to turn in direction of said return stroke of said third member.

3. A device as set forth in claim 2, wherein said moving means include a lever mounted at one end thereof for pivotal movement about said second axis, a drive pawl pivotally mounted on said lever and engaging said ratchet wheel, and eccentric means connecting said first member to said lever for oscillating the latter about said second axis.

4. A device as set forth in claim 3, and including means cooperating with said lever and said eccentric means for varying the oscillating movement of said lever.

5. A device as set forth in claim 4, wherein said means for varying the oscillating movement of said lever include a rod connected to said lever for limiting oscillation of the latter in one direction, and a lost motion connection between said eccentric means and said lever.

References Cited by the Examiner

UNITED STATES PATENTS 2,301,543  11/1942  Hlavaty _____ 74—117

MILTON KAUFMAN, *Primary Examiner.*